(12) United States Patent
Tanovic

(10) Patent No.: US 7,061,908 B1
(45) Date of Patent: Jun. 13, 2006

(54) SWITCH STRUCTURE

(75) Inventor: Kerim Tanovic, Armadale (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 966 days.

(21) Appl. No.: 10/018,564

(22) PCT Filed: Jun. 23, 2000

(86) PCT No.: PCT/AU00/00710

§ 371 (c)(1),
(2), (4) Date: Dec. 11, 2001

(87) PCT Pub. No.: WO01/01639

PCT Pub. Date: Jan. 4, 2001

(30) Foreign Application Priority Data

Jun. 25, 1999 (AU) .................................. PQ1200

(51) Int. Cl.
*H04Q 11/00* (2006.01)

(52) U.S. Cl. ...................... 370/372; 370/386

(58) Field of Classification Search ............. 370/367, 370/369, 370, 372, 375, 380, 386, 387, 388, 370/389, 400
See application file for complete search history.

(56) References Cited

U.S. PATENT DOCUMENTS

| | | | |
|---|---|---|---|
| 4,197,523 A * | 4/1980 | Philip et al. ............. 714/800 |
| 5,142,629 A * | 8/1992 | Byers et al. ............. 710/100 |
| 5,509,008 A | 4/1996 | Genda et al. ............. 370/60.1 |
| 5,654,956 A | 8/1997 | Frene et al. ............. 370/386 |
| 5,745,489 A | 4/1998 | Diaz et al. ............. 370/395 |
| 5,844,887 A | 12/1998 | Oren et al. ............. 370/218 |

FOREIGN PATENT DOCUMENTS

| | | |
|---|---|---|
| EP | 0 590 865 A3 | 4/1994 |
| EP | 0 690 636 A1 | 1/1996 |
| EP | 0 713 304 A3 | 5/1996 |

* cited by examiner

*Primary Examiner*—Brenda Pham

(57) ABSTRACT

This invention relates to a switch structure and more particularly to a switch structure for circuit switching of telecommunications signals, such as, but not exclusively, data. A switch arrangement for a Group switch adapted to switch communication signals is provided, the switch arrangement including, a first switching module (SE-1 to SE-N) having at least a first switching element (SE-2) and a second switching element (SE-3); a first communication path (HWH) interconnecting the first and second switching elements (SE-2, SE-3) a second switching module (SE-N+1 to SE-2N) having at least a third switching element (SE-N+3), and a second communicating path (HWV) interconnecting the second module and first module. The second communication path is provided between modules allowing a distribution of the switching function with a minimum of connections and at the same time providing a switch structure that can be easily scaled up for increased capacity.

19 Claims, 6 Drawing Sheets

HWH interconnect

SWITCH STRUCTURE

FIELD OF INVENTION

This invention relates to a switch structure and more particularly to a switch structure for circuit switching of telecommunications signals, such as, but not exclusively, data.

BACKGROUND ART

Switching in a telecommunications network or in general within a communications network allows one subscriber to connect with any other subscriber in the network and organises the flow of information between the subscribers so that they can communicate with each other.

One particular type of switching is called circuit switching where subscriber information is normally assigned to time slots and the actual switching is performed on these time slots. Thus, a switch, commonly known also as a Group switch, handles time slots such that subscriber information is switched or connected from an input point of the switch to an output point of the switch. The basic building blocks of such circuit switches are generally time (T) switch stages and space (S) switch stages. By combining the time switch stages and space switch stages in different ways, a variety of switch structures are obtained. Examples of such switch structures are time-space-time (TST) switches, space-time-space (STS) switches, time-space (TS) switches, TSST switches and SSTSS switches.

TS switches are of particular interest as they have a number of advantages including that these type of switches are inherently non-blocking for point-to-point connections as well as for broadcasting. This is not the case for other type switches. Furthermore, the TS switch structure has short delay through the switch and simple path selection.

Furthermore, speech store memories that are commonly utilised in TS switches have become faster and less expensive, thus making the TS switch structure interesting also for larger switches.

However, due to the large amount of internal connections between the speech store memories, control stores and multiplexers in a TS switch, the internal components of a TS switch have to be arranged tightly together in order to practically realise all connections. For this reason, the TS switch usually has to be provided in a single sub rack. Therefore, the size of the sub rack, memory performance and amount of required interconnections limits the maximum capacity of a TS switch. Conventional large TS switches have a capacity of 128 K, although high capacity is possible when the technology is stretched to its limits squeezing as many components and cable connections as possible into the same sub rack. In many telecommunication applications, higher capacities such as 256 K or 512 K are required, making the conventional TS switch structure insufficient.

Furthermore, the existing TS switches do not provide an efficient and simple technique for increasing capacity to large capacity TS switches ranging in size beyond 128 K.

It is an object of the present invention to address at least one problem associated with the prior art.

It is a further object of the present invention to provide an improved switch.

SUMMARY OF INVENTION

The present invention provides a high capacity scalable and non-blocking switch architecture for circuit switching in telecommunications networks. The present invention provides flexibility in that a scalable switch architecture can be achieved and high capacities such as 256 K and 512 K are realisable with the switch architecture of the present invention.

According to a first aspect of the present invention there is provided a switch arrangement for a Group switch adapted to switch communication signals, the switch arrangement including, a first switching module having at least a first switching element and a second switching element;
a first communication path interconnecting the first and second switching elements;
a second switching module having at least a third switching element, and;
a second communicating path interconnecting the second module and first module.

In essence, the invention is directed to providing a communication path between modules allowing a distribution of the switching function with a minimum of connections and at the same time providing a switch structure that can be easily scaled up for increased capacity.

The switch arrangement of the present invention preferably includes an inter module communication path interconnecting one switching element to another switching element of each module in the switch structure. Further to this, each module of the switching arrangement may have an intra module communication path interconnecting all switching elements of the module.

According to a second aspect of the invention there is provided a switch structure for switching data including:
a matrix of switching elements arranged in rows and columns;
each row of switching elements in said matrix having a first set of bidirectional data links wherein each switching element in said each row is connected to other switching elements in the same row by links of said first set;
each column of switching elements in said matrix having a second set of bidirectional data links wherein each switching element in said each column is connected to other switching elements in the same column by links of said second set;
wherein the matrix is adapted to interconnect data input to any one switching element in the matrix for output on any switching element in said matrix using said first and second sets of bidirectional links.

Preferably, the switch structure is a Group switch.

Each switching element may have a time-switching component formed from a number of data storage modules, each data storage module receiving time slot data from other switching elements in the same row of said switching element, and from control means. The control means may be arranged as a number of control store modules corresponding to the number of bidirectional data links in said second set of bidirectional data links. Each data storage module may have a number of outputs such that data is read from a designated location in each data storage module by a respective control store module and output on one of the output ports of the corresponding data storage module and transmitted to a selector means.

Each switching element may have a first space-switching component formed from said selector means and a further control means. The selector means may be arranged as a number of selector modules such that the data read from each data storage module by a respective control store module is input to one of the selector modules. The further control means may include a number of control store modules each storing control data which is used to select data from a corresponding selector module wherein data selected from each of the selector modules is output to a respective bidirectional data link in said second set of bidirectional data links. Each switching element may have a second space-switching component formed from a further selector means and associated control means. Data received at said switching element on said second set of bidirectional data links may be input to said further selector means which selects data to be output from one or more switch ports of the switching element on the basis of control information stored in said associated control means.

According to a third aspect of the invention there is provided a switch structure including a matrix of switching elements arranged in rows and columns, wherein each switching element has data storage modules for storing timeslot data transmitted from other switching elements in the same row on a first set of bidirectional data links;

each data storage module having at least one input and a plurality of outputs;

each switching element having control means for outputting data from each data storage module in accordance with control data stored in said control means, the output data being transmitted to a selector means;

each switching element having a further control means for supplying control information to said selector means wherein said selector means outputs selector output data in accordance with said control information on a link of a second set of bidirectional data links connecting said switching element to other switching elements in the same column as said switching element; and each switching element having a further selector means for receiving data from other switching elements in the same column as said switching element to be output from a switch port of said switching element.

The control means may include a number of control store modules and the selector means may include a number of corresponding selector modules.

Data received and stored in each data storage module may be stored at an address location in each storage module in accordance with a time slot counter means.

The control data stored in each control store module may be read in sequential order by using said counter means as an address pointer and said read control data may be used to read data stored in each of the data storage modules.

Each control store module may read data at a designated address location in each data storage module such that the read data is output to the same selector module in the selector means. Each selector module may select said selector output data for output onto a respective bidirectional data link to another switching element in the same column on the basis of said control information stored in corresponding control store modules of said further control means.

According to a fourth aspect of the present invention there is provided a switch structure for switching data, including:

a matrix of switching elements arranged in rows and columns;

a first set of bidirectional data links connecting switching elements in the same row;

a second set of bidirectional data links connecting switching elements in the same column;

each switching element having data storage modules for storing data received from other switching elements in the same row over said first set of links;

each switching element further having first selector means for selecting the stored data onto a link of said second set of links;

each switching element having second selector means for receiving data transmitted on said second set of links from other switching elements in the same column;

wherein data received at a switch port of an originating switching element is switched to a switch port of a destination switching element in said matrix using said first and second sets of links to transmit said data and selecting the data, through said second selector means, to be output on said switch port of said destination switching element.

The originating switching element may also be the destination switching element.

According to a fifth aspect of the present invention there is provided a method of switching data from a switch port of an originating switching element to a switch port of a destination switching element of a switch matrix, wherein the switch matrix is arranged in rows and columns of switching elements, said method including the steps of:

receiving data at said switch port of said originating switching element;

transmitting said data to be stored in data storage means in each switching element in the same row as said originating switching element;

reading the stored data under the control of a first control means in one of the switching elements in said same row and the same column as said destination switching element to a first selector means;

selecting said data, through said first selector means to be output onto one of a set of data links connecting switching elements in said same column, said destination switching element receiving the selected data at a second selector means;

wherein said selected data is then output to the switch port of said destination switching element through said second selector means.

According to a sixth aspect of the present invention there is provided a method of switching data using a switch structure including a matrix of switching elements arranged in rows and columns, wherein the data is switched from a switch port of an originating switching element to a switch port of a destination switching element in the matrix, said method including the steps of:

receiving data at said switch port of said originating switching element;

transmitting said received data over a first set of bidirectional links to one or more switching elements in the same row as said originating switching element;

storing said data in said one or more switching elements;

selecting said stored data to be output on a link of a second set of bidirectional links;

receiving the selected data at the destination switching element, and outputting the selected data on the switch port of said destination switching element.

The invention will hereinafter be described with reference to a preferred embodiment, by way of example only, and with reference to the accompanying drawings.

DESCRIPTION OF PREFERRED EMBODIMENT

Figure 1:
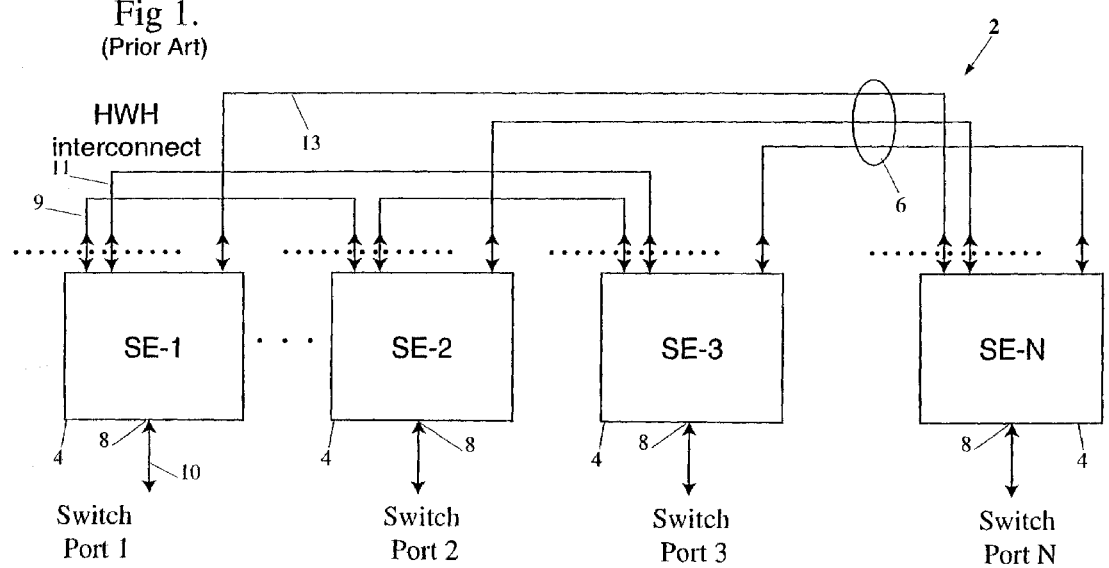
FIG. 1 is a block diagram of the general structure of a prior art TS switch.

By way of background information shown in FIG. 1 there is a TS switch structure 2 consisting of a row of N switching elements 4. The structure may extend in a matrix whereby there are a number of rows and columns that make up the switch structure. Each switching element 4 has memory means or data storage modules data in the form of speech store modules. Respective speech store modules in each switching element 4 of a particular row of the structure are connected via two-way data links 6, called horizontal highway interconnects (HWH) which are point-to-point two way high speed serial links, such that time slot data arriving at the various switch ports 8 of each switching element 4 on similar two-way data links 10 is simultaneously transferred over the HWH interconnects to respective speech store modules in other switching elements 4 in that row. For example, switching element SE-1 may receive time slot data at its switch port and this data is subsequently transmitted over HWH 9 to be received in a speech store in switching element SE-2, transmitted over HWH 11 to be received in a respective speech store in switching element SE-3 and the process continues right through the row of switching elements until switching element SE-N receives the same data in a respective speech store over HWH 13. Similarly any data received on switch ports associated with any of the other switching elements 4 in the same row is simultaneously transmitted over the data links 6 to be received in respective speech stores in the other switching elements in that row. For example, data received on switching element SE-2 is simultaneously transmitted over link 9 to be stored in a speech store of switching element SE-1 which may then be output, after a selection process to be discussed, on switch port 1.

Figure 2:
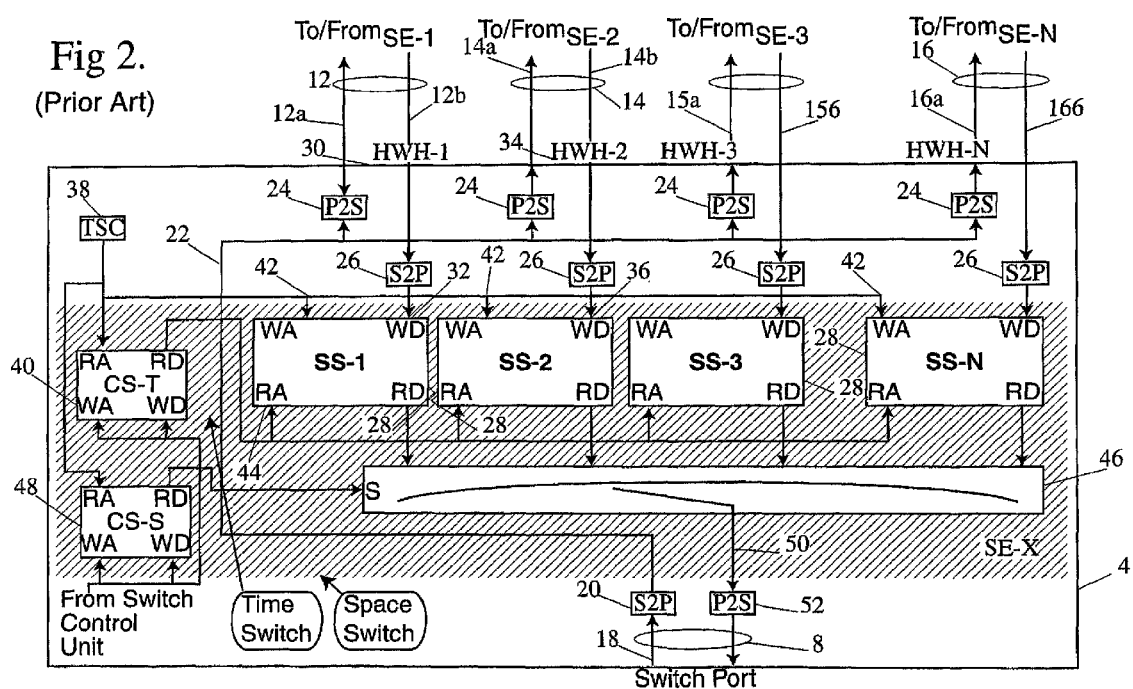
FIG. 2 is a block diagram of a switching element of the prior art TS switch of FIG. 1.

In FIG. 2 there is shown a detailed block diagram of one of the switching elements 4 of FIG. 1, for example $SE_{-x}$. Incoming high speed serial data representing user information is received at switch port 8 on link 18 which is converted into a parallel format by serial to parallel converter 20. It is found that parallel data has a lower speed and therefore it is more suitable for transmitting data and internal manipulation by the switching element 4. The parallel format of the data is transmitted along link 22 unchanged and broadcast to other switching elements in the same row through the HWH interfaces and links. HWH-1 is generally connected to SE-1, HWH-2 is connected to SE-2, HWH-x will loop back on itself and be connected to the sample switching element SE-x. Specifically the data on link 22 is converted back into serial form through parallel to serial converters 24 such that the data is transmitted on link 12a to switching element SE-1, on link 14a to switching element SE-2 and so on to switching element SE-N on link 16a. The data is also stored in the switching element SE-x in a corresponding speech store SS-x, after being output through interface HWH-x. However, this is only a logical interconnect and the data can be voided and stored internally through the switching element SE-x. It does not require a physical implementation. Similarly and at the same time any data received by switching element SE-x from all other switching elements in the row via the HWH interfaces is also converted into parallel format through the serial to parallel converters 26 and thereafter stored in respective speech storing units 28. Thus any data received from switching element SE-1 is received at the HWH-1 interface 30 to switching element SE-x on link 12b, converted to parallel format by the converter 26 and received at the Write Data (WD) port 32 to speech store unit SS-1 and stored. Similarly any data received from switching element SE-2 is received on link 14b by HWH-2 interface 34 to the switching element SE-x and from there it is converted by a serial to parallel converter and input to WD port 36 to speech store module SS-2 and written into and stored therein. Similar processes happen with respect to data received from the other switching elements in the row where it is received at a corresponding HWH interface to a switching element SE-x and stored in the corresponding speech store module. Each speech store module is essentially a two port random access memory (RAM) having a Write Address (WA) port, a read address port (RA), a Write Data (WD) port and a read data port (RD). Each set of data stored in respective speech store units is stored at a particular address pointed to by a time slot counter means 38 (TSC). A first control store module 40, CS-T, controls the read out of data from each one of the speech stores at its respective read data or RD ports. Specifically the TSC 38 points to an address associated with each speech store at its WA port to store the respective data at that address location in the speech store. Thus, time slots are stored in each speech store in sequential order using the TSC 38 as an address pointer. The CS-T 40 is a type of memory module, such as a RAM, and also has a WA port and a WD port for receiving control data from a switch control unit, which is usually a micro computer which control data dictates how data is to be read from each of the speech store modules. The CS-T 40 is read in sequential order using the TSC 38 as an address pointer, and the read data from the RD port of CS-T module 40 is then used as a pointer for reading each of the speech store modules SS-1 up to SS-N. Each of the stored data in the speech store modules is retrieved through respective read address or RA ports 44 and the data is read out from its RD port and input to a selector means 46, such as a multiplexer. Thus data is read from each speech store module in arbitrary order in accordance with the control data stored in the CS-T module 40. The read out of data from each of the speech store modules gives the TS switch unit its time-switching functionality. Thus the CS-T module 40 and each of the speech store modules represent the time switching capability or time switching stage of the switching element SE-x. All TSCs in the switching elements are mutually synchronised in known manner, which will not be described.

A second or further control means, in the form of a control store module 48, CS-S is used to select data from one of the N switch store modules as the current time slot output which is sent to switch port 8 over link 50 via a parallel to serial converter 52. The control store module 48 also has a WA port and WD port for receiving and writing therein control data from a switch control unit. Similarly as for the unit 40, the unit 48 is read in sequential order using the TSC 38 as an address pointer and the read data is used to control and finally select the data from one of N speech stores in accordance with the control information or data stored in the module 48. Thus the module 48 and the multiplexer 46 provide the space switching stage or space switching functionality of the TS switch. Connections are set up and cleared by simply writing the switching information from the switch control unit into each of the CS-T and CS-S memories.

The abovementioned structure of the TS switch has inherent disadvantages. The arrangement shown in FIG. 1 requires each switching element to have N−1 two way interconnection links with other switching elements in order to achieve a capacity of N switch ports. However if capacity is required to be increased from N to 2×N ports, then 2×N switching elements will be needed. In turn each switching element will require 2×N−1 interconnection links with other switching elements in the switch and furthermore, the number of speech store modules in each switching element will also double to 2×N. This increases the total number of interconnection wires required and as described before, the capacity of the switch is limited by the size of the sub rack, memory performance and of course the increased number of interconnection sets.

Figure 3:
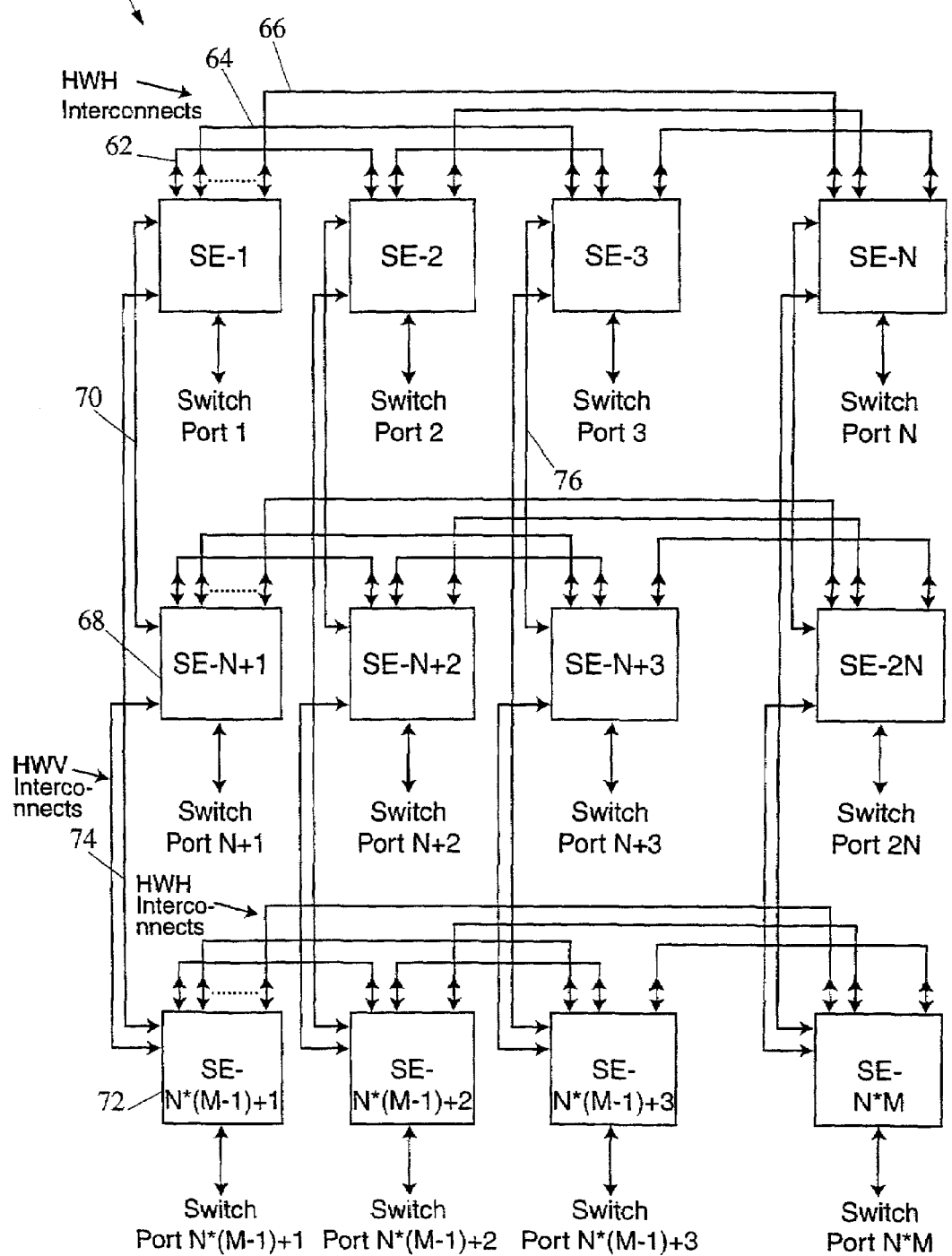
FIG. 3 is a block diagram showing the structure of a TSS switch having a capacity of M×N switch ports according to the present invention.

However with the arrangement shown in FIG. 3, in accordance with the present invention, there is shown a TSS switch with a capacity of N×M switch ports in a matrix of switching elements of N×M. The matrix 60 is arranged in rows of switching elements with the first row beginning with switching element SE-1 and ending in SE-N and the last row starting with switching element SE-N*(M−1)+1 and ending in switching element SE-N*M. It is also arranged in a number of columns with the first column starting with switching element SE-1 and last switching element in first column being switching element SE-N*(M−1)+1 and with the last column starting with switching element SE-N and ending in switching element SE-N*M. Each switching element in each row is connected to every other switching element in that same row via two way high speed data links or HWH interconnects, being a first set of bidirectional data links. For example the switching element SE-1 has links to switching element SE-2 via the two way data link 62 and has links to switching element SE-3 via the link 64 and to switching element SE-N via link 66. Each switching element in the same column is linked to every other switching element in that column via two-way high speed data links called Highway Vertical Interconnects (HWV) being a second set of bidirectional data links. For example, switching element SE-1 is linked to the next switching element 68 via the two way data link 70 and to the last switching element 72 in that column via the two way data link 74. With this arrangement it can be therefore seen that data arriving at any particular switch port of a switching element may be transferred to any other switching element in the matrix and output on that particular switch port. By way of example data input at switch port 1 on switching element SE-1 may be output on switch port N+3 of switching element SE-N+3 by using the data link 64 to copy that data into switching element SE-3 and then using the highway vertical data link 76 to switch that data out on switch port N+3.

Thus it can be seen that using this TSS structure the number of interconnection links is dramatically reduced in that each switching element need only (N−1) links to the other switching elements in that particular row and (M−1) links to every other switching element in its particular column giving a total number of links of M+N−2. Each switching element has N HWH interfaces but only (N−1) interconnecting links to other switching elements in the same row, with the remaining interface having an interconnect link looped back on itself at the same SE. Furthermore, each switching element has M HWV interfaces but only (M−1) interconnecting links to other switching elements in the same column, with the remaining interface having an interconnect link looped back on itself at the same SE. Generally, for each TSS switch, all SE's in column x have their HWH-x looped back and all SE's in row y have their HWV-y looped back. Comparatively for a TS switch of the same size it will require N×M switching elements and each switching element would therefore need N×M−1 interconnection links to each of the other switching elements in the switch matrix. The optimal switch structure is obtained if the TSS switch is organised in a square matrix, where M=N. Below is a table showing the comparison of the number of interconnections required for each of the TSS and TS switches for a given number of switching elements in the particular switch structure.

| Switch capacity [number of SEs] | TSS matrix Structure [M*N] | Number of interconnect links in equivalent TS switch | Number of interconnect links in TSS switch |
| --- | --- | --- | --- |
| 16 | 4 × 4 | 15 | 6 |
| 32 | 8 × 4 | 31 | 10 |
| 64 | 8 × 8 | 63 | 14 |
| 64 | 16 × 4 | 63 | 18 |
| 100 | 10 × 10 | 99 | 18 |

Figure 4:
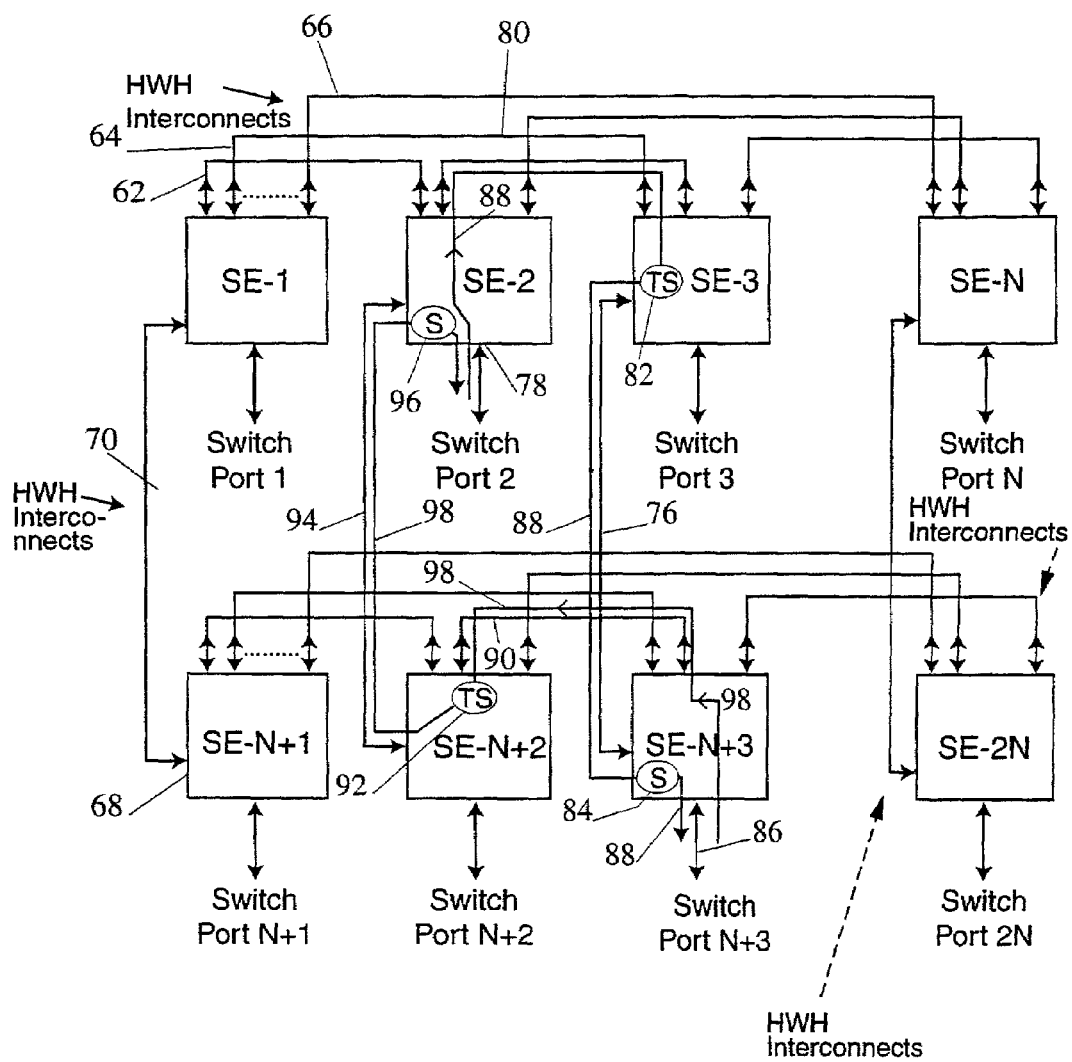
FIG. 4 is a block diagram showing a 2×N TSS switch matrix structure in accordance with the present invention.

To show how various time slot data is switched from one switch port to another switch port in the TSS switching matrix we refer to FIG. 4 in which is shown a 2×N TSS switch matrix. In this particular example the number of interconnects that each switching element requires is 2+N−2 which is equal to N interconnects. In FIG. 4 there is shown a particular example of data being switched from switch port 2 of switching element SE-2 to switch port N+3 of switching element SE-N+3 and vice versa. Incoming time slot data at the switch port 78 to switching element SE-2 is simultaneously transferred on each of the highway horizontal interconnects to each of the other switching elements in that particular row including the data being transferred along data link 80 to be received at one of the speech stores in switching element SE-3. The incoming data is also stored in a respective speech store, for example SS-2, in switching element SE-2. In SE-3 the data transferred over link 80 is placed through a TS stage or a time switch and a first space switch stage 82 to be discussed in relation to FIG. 5. It is then output onto the vertical highway data link 76 to be received in a second space switch 84 in switching element SE-N+3. The appropriate time slot from the link 76 is then selected as an output onto switch port 86 of that switching element. The flow of the data from the initial reception at switch port 2 through to switching element SE-3 and then on to switching element SE-N+3 is shown by way of a flow line 88 to more clearly see the flow of data between the switching elements. In a similar fashion incoming data received at the switch port 86 of switching element SE-N+3 is simultaneously transferred onto each of the data links or horizontal highways HWH's connecting SE's in that row so that the data is transferred to each switching element in that particular row, as well as being stored in SE-N+3. In particular the incoming data is transferred via data link 90 to the switching element SE-N+2 and received at a speech store and received in the time and space switching arrangement 92 in the switching element SE-N+2. There it is switched to an appropriate time slot using this switching arrangement 92 and output on a vertical highway link 94 to be received in switching element 2 via a second space switching stage 96 and from there it is selected on to the output switch port 78. Thus a two way connection is set up as two independent one way connections by writing appropriate control data in the control stores in the respective switching elements involved in the switching path. To see the actual data flow from the switch port N+3 of switching element SE-N+3 through switching element SE-N+2 and then finally to switching element SE-2 a data flow line 98 is shown.

Figure 5:
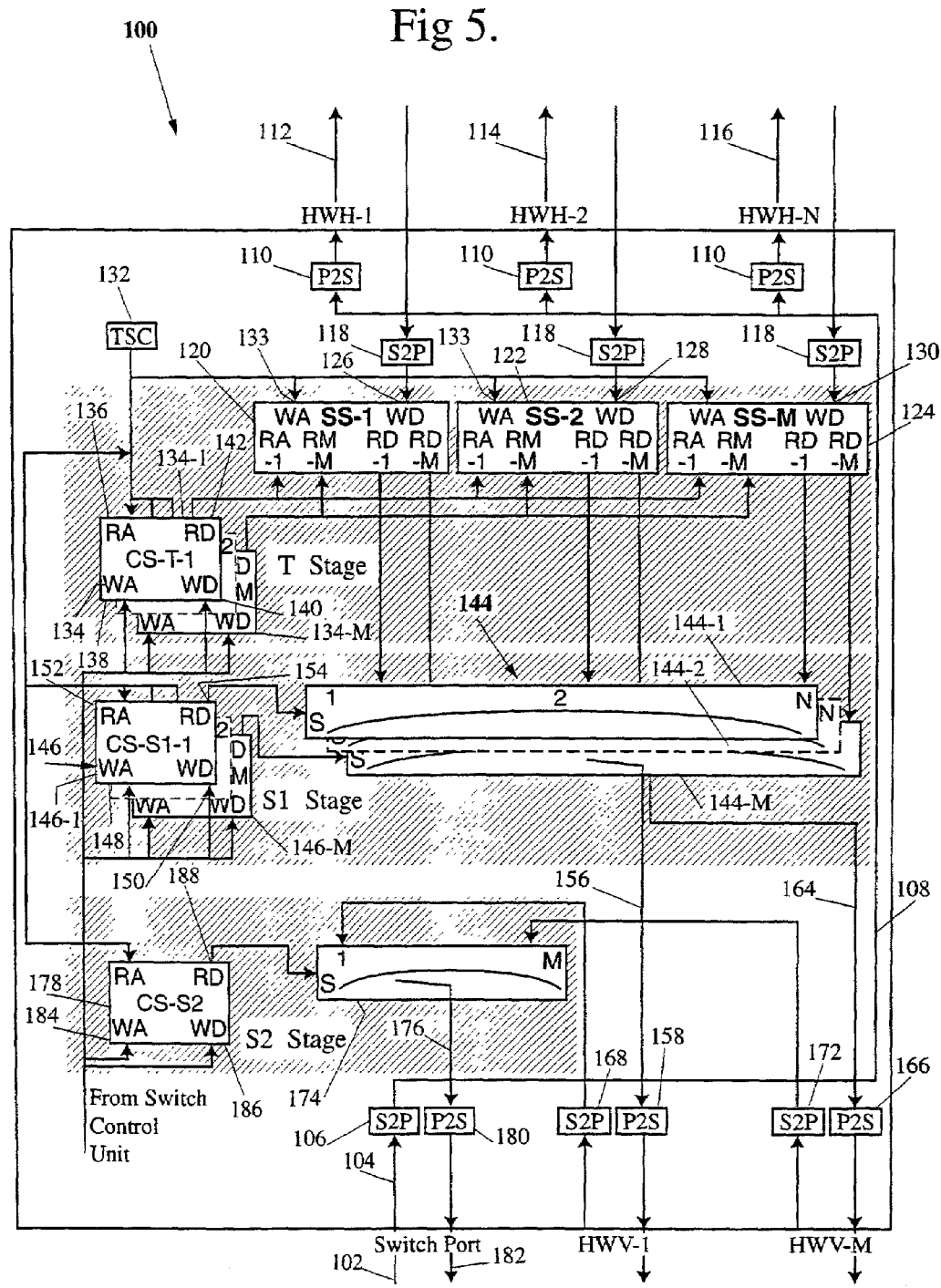
FIG. 5 is a block diagram of a TSS switching element of the TSS switch in FIG. 3 or FIG. 4 according to the present invention.

In FIG. 5 there is shown in block diagram form one of the switching elements $SE_{yx}$, where x is the column position and y is the row position of the switching element in the matrix shown in FIG. 4 in greater detail. Incoming high speed serial data received at switch port 102 on link 104 is input to serial to parallel converter 106 and thus converted into parallel format and transmitted over link 108 through the switching element to each of parallel to serial converters 110 and thereafter the data is simultaneously distributed and broadcast in serial form to all HWH interfaces connecting this switching element to each other switching element in the same row in the matrix. The same data is also retained and stored in one of the speech stores in the switching element 100 shown in FIG. 5. The data is transmitted on respective data links 112 to the first switching element in the same row, $SE_{y1}$, link 114 to $SE_{y2}$ and link 116 to $SE_{yn}$. At the same time data may be received from other switching elements in the same row and received over HWH data links and received at the switching element 100 at the HWH interfaces HWH-1 from $SE_{y1}$, HWH-2 from $SE_{y2}$ up to HWH-N from $SE_{yn}$ as shown in FIG. 5. The data being in serial form is then converted into parallel form through serial to parallel converter 118 to be received and stored in respective speech store modules 120, 122 and 124. So for example data being received at HWH-1 interface is written into speech store module 120 at WD port 126, data received at the interface HWH-2 is written and stored in speech store module 122 through WD port 128 and data received at interface HWH-N is written into and stored in speech store module 124 through WD port 130. All of the above actions of writing the data into the speech store modules is performed under the control of the time slot counter unit 132 which points at an address in each speech store for where the received data is going to be stored. This is done by the TSC 132 writing the address for each received time slot data at the various WA ports 133 to each speech store module. Each of the speech store modules 120, 122 and 124 have one write address port, one write data port and multiple M read ports. In other words each speech store module has M read address ports and M read data ports. There are M read ports for each speech store module to enable data to be read on to any one or more of the M highway vertical interconnections between switching elements in the same column of the switching matrix.

A first series of control store modules, generally designated 134, and comprising control store modules 134-1, 134-2 up to 134-M wherein each one of the control store modules in the series is associated with a particular read port in each of the speech store modules. Each of the control store modules is a two port memory means, that is having one read address port, one read data port, a write address port and a write data port. Each control store module is read in sequential order using the time slot counter 132 as an address pointer and then the read data in each control store module is used as a pointer for reading each of the associated speech store modules. Thus each control store module receives a signal from the time slot counter 132 at its read address port 136 and the data being read is control store data already written into each control store module through the write address 138 and write data ports 140 of each control store module in the series 134. Such control store data is received from a switch control unit. Thus the read data is output from RD port 142 and used as a pointer for reading data from each one of the speech store modules at a corresponding read port in each speech store module. For example read data from control store module 134-1 is used to read data from read data port RD1 of each of the speech store modules 120, 122 up to 124. Similarly the read data from control store module 134-2 is used to read data from read port RD2 of each of the speech store modules and the read data from control store module 132M is used to read data from the Mth port RDM of each of the speech store modules. Thus it will be seen in this arrangement that M control store modules will be needed, one for each of the M highway verticals HWV's. This particular stage is the time switching stage of the switch wherein time slots are stored in each speech store memory module in sequential order using the TSC 132 as an address pointer and data is read from its speech store module in arbitrary order using data stored in each of the control store modules 134.

Each of the time slot data read from corresponding ports in each of the speech store modules is input to a selector means, generally designated as 144, from where time slot data is selected from one of the N speech store modules as the current time slot output to be sent on a respective highway vertical HWV link. Each of the selector means or multiplexers may be designated as 144-1, 144-2, up to 144-M where data read from the first read port RD-1 of each speech store module is received by the multiplexer at 144-1, similarly the read data from RD-2 port of each speech store module is received by the multiplexer at 144-2 and each of the data read from the read ports RD-M from each of the speech store modules are received by the multiplexer 144-M. Data from each of the selector means modules is selected by a further control means in the form of a series of control store modules generally designated by 146 wherein there is one control store module for each multiplexer in the series 144, thus control store module 146-1 is associated with multiplexer 144-1 and this process repeats for each of the control store modules and multiplexers wherein control store module 146-M corresponds with or is associated with multiplexer 144-M. As with the first series of control store modules 134, data is written into each of the control store modules 146 from a switch control unit through write address ports and write data ports each associated with the control store modules in the series 146. Each of the control store modules in the series 146 has one write address port 148 one write data port 150, one read address port 152 and one read data port 154. Each control store module in the series 146 is read in sequential order using TSC 132 as an address pointer and then the read data in each control store module is used to control and to select the current time slot through a corresponding multiplexer 144, in accordance with the control data information. Thus the control data information is written into each of the control store modules 146 from the switch control unit and this read data is used to select the current time slot from one of N speech store modules in each of the multiplexers 144. By way of example, data is read from control store module 146-1 in accordance with control data stored therein and this is used to select the current time slot to be output on line 156 from any one of the inputs to the multiplexer 144-1 from read port RD-1 of each speech store module. Thus there are N inputs to the multiplexer 144-1 from each of the speech store modules representing data read from the port RD-1 from each speech store module. Each of the selector means 144 and control stores 146 implements the first space switching stage of the TSS switch. The selector output data on line 156 is input to a parallel to serial converter 158 and transmitted to HWV interface HWV-1 and sent to the first switching element in the same column to be output at the switch port of the first switching element in the same column to be described hereinafter. So, for example if the switching element in FIG. 5 is designated $SE_{yx}$, then the output data on HWV-1 is transmitted to switching element $SE_{1x}$. Similarly the selected data from multiplexer 144-2 is output on a link and input to a parallel to serial converter to be output on highway vertical through the HWV-2 interface to switching element $SE_{2x}$. This process repeats up until data from the Mth multiplexer 144-M is output on link 164 to parallel to serial converter 166 which in turn the data is output through the highway vertical interface HWV-M and transmitted to switching element $SE_{mx}$. Thus there are (M) interfaces for HWVs, but only (M−1) interconnecting links to other switching elements in the same column. The remaining interface/link is looped back on itself at switching element $SE_{yx}$ which is the HWV-y.

Data received on each of the highway vertical interconnecting links is received at respective interfaces HWV-1 from $SE_{1x}$, HWV-2 from $SE_{2x}$ up to HWV-M from $SE_{mx}$, and then the received data is converted into parallel format through serial to parallel converters 168 to 172 respectively and thereafter fed as inputs to a further selector means, in the form of a multiplexer 174. Thus there are M inputs to this multiplexer and the current time slot data is appropriately selected on link 176 under the control of a further control store module 178 and is then input to a further parallel to serial converter 180 and switched from the switch port 102 on output link 182.

The control store module 178 receives control data information from the switch control unit through its write address port 184 and write data port 186. The module 178 is read at its RA port in sequential order using TSC 132 as an address pointer. This read data is used and read out of the RD port 188 and input to the multiplexer 174 to select the current data in accordance with the control data information as previously described onto link 176. As there is only one switch port associated with this switching element 100, only one multiplexer and therefore one control store unit 178 is needed. If a switching element has further switch ports, then the system will require a control store module and corresponding multiplexer for each of the switch ports. This particular stage implements the second space switching stage of this switching element.

Where timeslot data is required to be switched from a switch port in one switching element, say $SE_{3x}$, to a switch port of another switching element, say $SE_{5x}$, in the same column of the first-mentioned switching element, the following occurs;

the data is received and stored in one of the speech store modules SS-x of the switching element $SE_{3x}$ after being looped back from interface HWH-x, and then output to the appropriate multiplexer in the selector means 144, under control of control data stored in a corresponding control store 134. The data is then selected and switched to the HWV-5 and transmitted to the second space switching stage for output on a switch port of the switching element $SE_{5x}$.

Figure 6:
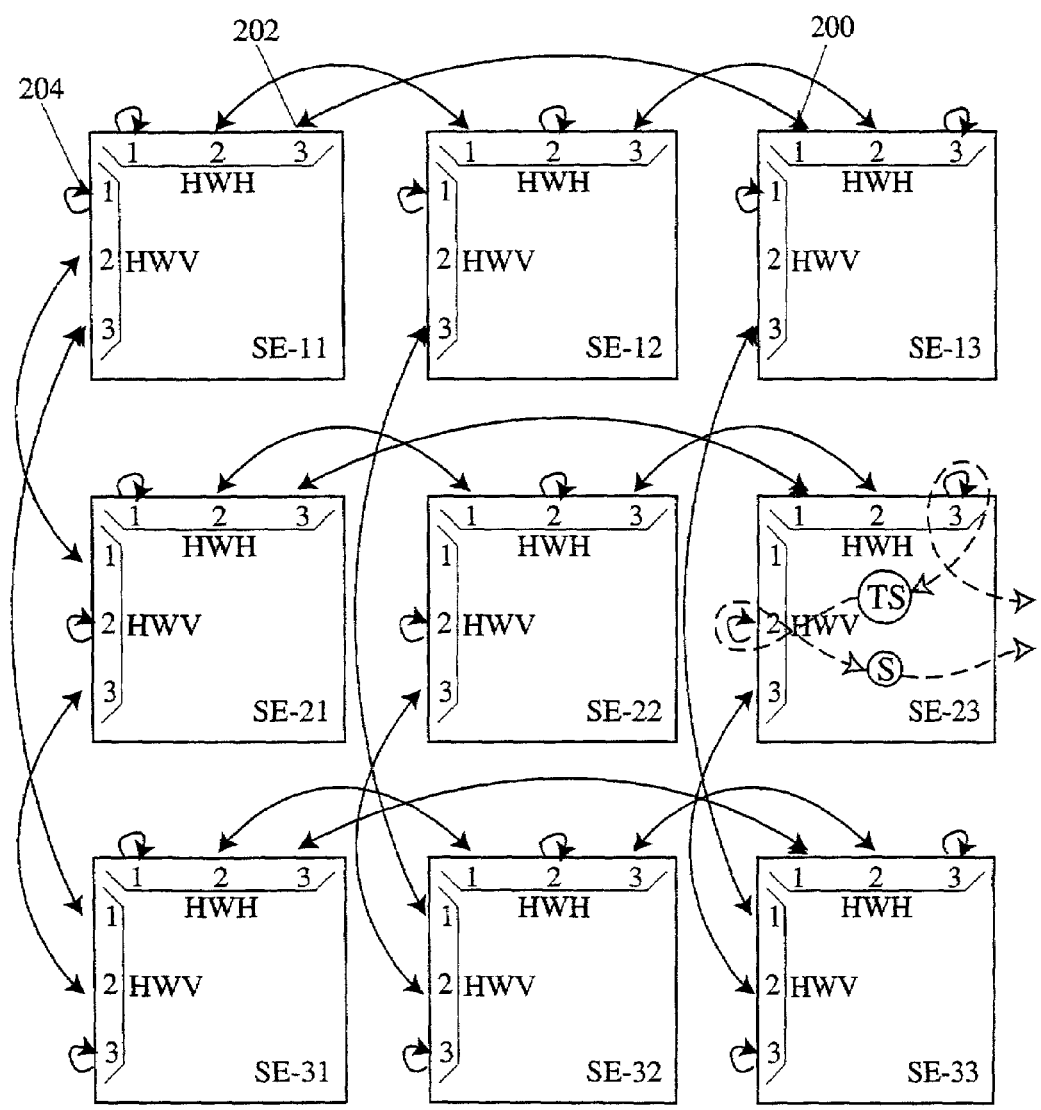
FIG. 6 is a block diagram showing interconnections between switching elements of a 3×3 TSS switch matrix structure according to the present invention.

Referring to FIG. 6, there is shown a 3×3 matrix of switching elements where each switching element is denoted as $SE_{-yx}$ where y is the row and x designates the column that the switching element is in. A particular example is to be described where timeslot data is input to a switch port of one switching element, SE-23, and output on the switch port of the same switching element SE-23. This often happens in small systems for example where there is only one switching element in the system. Originating timeslot data input to the switch port of SE-23 is transmitted to HWH-3 and looped back and written into speech store SS-3 of the switching element SE-23. From there the data is switched or selected by one of the multiplexers 174, as with the switching element shown on FIG. 5, and output onto the appropriate timeslot on HWV-2 which is also looped back to the same switching element so that the timeslot data will finally be selected by the multiplexer 174 shown in the second space switching stage, as with FIG. 5, and output onto the output switch port of SE-23. Thus the same switching principles apply to data that is input and output on one switching element as it would be for any data input on one switching element in a matrix and output on another switching element in the matrix.

As a further example data that is to input on switching element SE-13 and is required to be output on another switching element in the same row, say SE-11, then the data input to the switching element SE-13 is output on HWH-1, denoted by 200 and transmitted to HWH-3 of switching element SE-11, denoted by 202. From there it is stored in speech store SS-3 of the switching element SE-11 and time-switched and then space-switched through an equivalent multiplexer 144 and output onto highway vertical link HWV-1, designated by 204 where it is looped back to the equivalent multiplexer 174 in switching element SE-11 and from there it is selected and output onto the output switch port of SE-11.

The present invention, through the TSS arranged switching architecture in each switching element, and the reduced number of links required between switching elements in a switch matrix, enables scalability so that high capacity switch structures can be achieved.

What is claimed is:

1. A switch structure for switching data including:
   a matrix of switching elements arranged in rows and columns;
   each row of switching elements in said matrix having a first set of bidirectional data links wherein each switching element in said each row is connected to other switching elements in the same row by links of said first set;
   each column of switching elements in said matrix having a second set of bidirectional data links wherein each switching element in said each column is connected to other switching elements in the same column by links of said second set;
   wherein the matrix is adapted to interconnect data input to any one switching element in the matrix for output on any switching element in said matrix using said first and second sets of bidirectional links; and
   wherein each switching element includes a first time-switching component including a number of data storage modules and a first time switching control means.

2. A switch structure as claimed in claim 1 wherein each data storage module receives time slot data from the first time switching control means and other switching elements in the same row.

3. A switch structure as claimed in claim 2 wherein the first time switching control means includes a number of time switching control store modules corresponding to the number of bidirectional data links in said second set of bidirectional data links.

4. A switch structure as claimed in claim 3 wherein each data storage module includes a number of output ports such that data is read from a designated location in each data storage module by a respective time switching control store module and output on one of the output ports of each data storage module and transmitted to the first selector means.

5. A switch structure as claimed in claim 4 wherein the first selector means includes a number of selector modules such that the data read from each data storage module by the respective time switching control store module is input to a corresponding selector module.

6. A switch structure as claimed in claim 5 wherein the first space switching control means includes a number of space switching control store modules corresponding to the number of bidirectional data links in said second set of bidirectional data links.

7. A switch structure as claimed in claim 6 wherein each space switching control store module stores control data used to select data from a corresponding selector module wherein data selected from each of the selector modules is output to the respective bidirectional data link in the second set of bidirectional data links.

8. A switch structure as claimed in claim 7 wherein the second selector means receives data transmitted on the second set of bidirectional data links.

9. A switch structure as claimed in claim 8 wherein the second selector means selects data to be output by the switching element in accordance with control data stored in the second space switching control means.

10. A switch structure for switching data including:
a matrix of switching elements arranged in rows and columns;
each row of switching elements in said matrix having a first set of bidirectional data links wherein each switching element in said each row is connected to other switching elements in the same row by links of said first set;
each column of switching elements in said matrix having a second set of bidirectional data links wherein each switching element in said each column is connected to other switching elements in the same column by links of said second set; wherein the matrix is adapted to interconnect data input to any one switching element in the matrix for output on any switching element in said matrix using said first and second sets of bidirectional links; and
wherein each switching element includes a first space switching component including a first selector means and a first space switching control means.

11. A switch structure as claimed in claim 10 wherein each switching element includes a second space switching component including a second selector means and a second space switching control means.

12. A switch structure including a matrix of switching elements arranged in rows and columns, wherein each switching element has data storage modules for storing timeslot data transmitted from other switching elements in the same row on a first set of bidirectional data links;
each data storage module having at least one input and a plurality of outputs;
each switching element having control means for outputting data from each data storage module in accordance with control data stored in said control means, the output data being transmitted to a selector means;
each switching element having a further control means for supplying control information to said selector means wherein said selector means outputs selector output data in accordance with said control information on a link of a second set of bidirectional data links connecting said switching element to other switching elements in the same column as said switching element; and
each switching element having a further selector means for receiving data from other switching elements in the same column as said switching element to be output from a switch port of said switching element.

13. A switch structure as claimed in claim 12 wherein the control means includes a number of control store modules and the selector means includes a number of corresponding selector modules.

14. A switch structure as claimed in claim 13 wherein data received and stored in each data storage module is stored at an address location in each storage module in accordance with a time slot counter means.

15. A switch structure for switching data, including:
a matrix of switching elements arranged in rows and columns;
a first set of bidirectional data links connecting switching elements in the same row;
a second set of bidirectional data links connecting switching elements in the same column;
each switching element having data storage modules for storing data received from other switching elements in the same row over said first set of links;
each switching element further having first selector means for selecting the stored data onto a link of said second set of links;
each switching element having second selector means for receiving data transmitted on said second set of links from other switching elements in the same column;
wherein data received at a switch port of an originating switching element is switched to a switch port of a destination switching element in said matrix using said first and second sets of links to transmit said data and selecting the data, through said second selector means, to be output on said switch port of said destination switching element.

16. A switch structure as claimed in claim 15 wherein the originating switching element may also be the destination switching element.

17. A switch structure as claimed in claim 15 wherein the switching elements form a TSS switch structure.

18. A method of switching data from a switch port of an originating switching element to a switch port of a destination switching element of a switch matrix, wherein the switch matrix is arranged in rows and columns of switching elements, said method including the steps of:
receiving data at said switch port of said originating switching element;
transmitting said data to be stored in data storage means in each switching element in the same row as said originating switching element;
reading the stored data under the control of a first control means in one of the switching elements in said same row and the same column as said destination switching element to a first selector means;
selecting said data, through said first selector means to be output onto one of a set of data links connecting switching elements in said same column,
said destination switching element receiving the selected data at a second selector means;
wherein said selected data is then output to the switch port of said destination switching element through said second selector means.

19. A method of switching data using a switch structure including a matrix of switching elements arranged in rows and columns, wherein the data is switched from a switch port of an originating switching element to a switch port of a destination switching element in the matrix, said method including the steps of:

receiving data at said switch port of said originating switching element;

transmitting said received data over a first set of bidirectional links to one or more switching elements in the same row as said originating switching element;

storing said data in said one or more switching elements;

selecting said stored data to be output on a link of a second set of bidirectional links;

receiving the selected data at the destination switching element, and outputting the selected data on the switch port of said destination switching element.

\* \* \* \* \*